United States Patent [19]
Kulik et al.

[11] Patent Number: 5,724,528
[45] Date of Patent: Mar. 3, 1998

[54] PCI/ISA BRIDGE HAVING AN ARRANGEMENT FOR RESPONDING TO PCI ADDRESS PARITY ERRORS FOR INTERNAL PCI SLAVES IN THE PCI/ISA BRIDGE

[75] Inventors: Amy Kulik; William Alan Wall, both of Austin, Tex.; Daniel R. Cronin, III, Lake Worth, Fla.

[73] Assignee: International Business Machines Corp., Armonk, N.Y.

[21] Appl. No.: 683,867

[22] Filed: Jul. 19, 1996

Related U.S. Application Data

[63] Continuation of Ser. No. 351,194, Nov. 30, 1994, abandoned.

[51] Int. Cl.$^6$ ................................................. G06F 13/00
[52] U.S. Cl. ........................................... 395/308; 395/309
[58] Field of Search ................................. 395/306–309, 395/184.01, 185.01, 185.02, 185.06

[56] References Cited

U.S. PATENT DOCUMENTS

| | | | |
|---|---|---|---|
| 5,109,381 | 4/1992 | Duxbury et al. | 395/185.02 |
| 5,255,374 | 10/1993 | Alderequia et al. | 364/DIG. 1 |
| 5,313,627 | 5/1994 | Amini et al. | 395/575 |
| 5,325,499 | 6/1994 | Kummer et al. | 395/425 |
| 5,392,407 | 2/1995 | Heil et al. | 395/293 |
| 5,396,602 | 3/1995 | Amini et al. | 395/293 |
| 5,404,559 | 4/1995 | Bonella et al. | 395/800 |
| 5,455,915 | 10/1995 | Coke | 395/308 |
| 5,471,590 | 11/1995 | Melo et al. | 395/288 |
| 5,499,346 | 3/1996 | Amini et al. | 395/308 |

OTHER PUBLICATIONS

"Peripheral Component Interconnect (PCI) Specification" Revision 1.0, Jun. 22, 1992, Intel Corporation.

*Primary Examiner*—Jack B. Harvey
*Assistant Examiner*—Sumati Lefkowitz
*Attorney, Agent, or Firm*—George E. Grosser

[57] ABSTRACT

A peripheral controller interconnect/industry standard architecture (PCI/ISA)bridge is coupled between the PCI and ISA buses in a computer system. A PCI master in the system asserts address and address parity information on the PCI bus to initiate a master-slave transaction over the PCI bus. The bridge includes logic for comparing the address and the address parity information and generating an address parity error signal when there is an address parity error. The bridge also includes a PCI slave that receives the address parity error signal and generates a target-abort signal in response if the PCI slave has already claimed the address by asserting a device select signal. The bridge also includes logic that prevents the target-abort signal from propagating to the PCI bus whenever this logic receives both the address parity error signal and the device select signal. This allows the master to perform a master-abort and prevents the PCI slave on the bridge from performing a target-abort when there is an address parity error.

4 Claims, 3 Drawing Sheets

PCI/ISA BRIDGE HAVING AN ARRANGEMENT FOR RESPONDING TO PCI ADDRESS PARITY ERRORS FOR INTERNAL PCI SLAVES IN THE PCI/ISA BRIDGE

The application is a continuation of application Ser. No. 08/351,194 filed on Nov. 30, 1994, now abandoned

BACKGROUND OF THE INVENTION

1. Field of the Invention

The present invention relates to the field of digital computer systems, and more particularly, to master-slave transactions on a PCI bus.

2. Description of Related Art

In computer systems, electronic chips and other components are connected with one another by buses. A variety of components can be connected to the bus providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, higher-speed input/output devices commonly used in computer systems require faster buses.

A solution to the general problem of sending and receiving data from the processor to any high-speed input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, etc. can also attach directly or indirectly (e.g., through a host bridge) to the PCI bus.

A bridge chip is provided between the PCI bus and the ISA bus in order to provide communication between devices on the two buses. The bridge chip essentially translates the ISA bus cycles to PCI bus cycles, and vice versa.

Many of the devices attached to the PCI bus and the ISA bus are master devices that can conduct processing independently of the bus or other devices. Certain devices coupled to the buses are considered to be slaves or targets that accept commands and respond to requests of a master. According to the PCI protocols, set forth in the PCI specification (herein incorporated by reference) a PCI slave needs to respond to a master that requests a transaction with that slave within a certain predetermined time period, for example, five clocks after the PCI master has asserted a frame signal.

In a normal PCI transaction, the PCI master will assert a frame signal (FRAME#) along with an address signal and address parity information. The PCI slave coupled to the PCI bus will decode the address after detecting the frame signal on the PCI bus to determine if the slave is being addressed by the PCI master. If the PCI slave determines that it is being addressed by the master, it will assert a device select signal (DEVSEL#) to claim the cycle. At the same time, however, the slave compares the parity address information with the address asserted by the PCI master. If an address parity error is detected by this PCI slave, it can perform a master-abort, perform a target-abort by deasserting the device select signal DEVSEL# and asserting a stop signal (STOP#), or ignore the parity error. The target-abort ends the master-slave transaction cycle even if the master intended the transaction to be performed with a different slave and that different slave was able to respond to the transaction.

A PCI master can also perform a master-abort, and does so when it fails to receive a device select signal DEVSEL# from a PCI slave within a certain time period after the assertion of FRAME# by the PCI master. The predetermined time period can be five clock cycles after the assertion of FRAME#, for example. The failure to receive a device select signal DEVSEL# indicates that no PCI slave has claimed the cycle so that the PCI master will effectively end the master-slave transaction cycle.

The bridge chip interfacing between the PCI bus and the ISA bus can be configured to contain elements operating as PCI slaves. However, a problem with such an arrangement is that the PCI slaves on the bridge chip must respond to the FRAME# on the PCI bus within the time limits defined by the protocol of the PCI bus. This is particularly troublesome when the bridge chip is a relatively low-speed chip. In order to provide the response to the PCI master within the specified time period, the PCI slave within the bridge chip must respond as a fast PCI device by asserting the device select signal within the clock cycle after receiving the FRAME#. The bridge chip would then assert in the following cycles the device select signal DEVSEL# to the PCI bus and the PCI master. Once a device select signal DEVSEL# is asserted by a PCI slave, a master-abort termination is not possible, only a target-abort.

It is possible, however, due to parity error, that the PCI slave within the bridge chip is not the intended target of the PCI master for the master-slave transaction. In such a case, a target-abort is inappropriate since the master-slave transaction is meant for another slave which could possibly still claim the address. The bridge therefore performs an address parity error check using the address and the address parity information provided by the PCI master. If the bridge determines that there is an address parity error, it will provide an address parity error signal to the PCI slave within the bridge. Because of the fast response required by the PCI protocol, however, the PCI slave needs to assert the device select signal DEVSEL# within a time period before the bridge can check for the address parity error and generate the address parity error signal to the PCI slave on the bridge. There is therefore a dilemma created by the requirement of asserting the device select signal DEVSEL# internally by the PCI slave such that a response can be made to the master within the predetermined time period for PCI transactions, and preventing the PCI slave within the bridge from generating a target-abort on the PCI bus since another slave may be the intended target.

SUMMARY OF THE INVENTION

There is a need for a method and a system using a PCI bridge having PCI slaves that respond within the predetermined time period to frame signals asserted by PCI masters, without requiring target-aborts to be generated on the PCI bus in response to an address parity error.

These and other needs are met by the present invention which provides a bridge for interfacing between buses of a computer system having first and second buses and a master coupled to the first bus that asserts an address and address parity information on the bus to initiate a master-slave transaction over the first bus. The bridge comprises logic for comparing the address and the address parity information and generating an address parity error signal when there is a parity address error. A slave in the bridge receives the parity address error signal and generates a target-abort signal in response. The bridge also has logic for preventing the target-abort signal from propagating to the first bus.

The earlier stated needs are also met by another embodiment of the present invention which provides a computer system comprising first and second buses, a master coupled to the first bus which asserts an address and parity information on the bus to initiate a master-slave transaction over the first bus. A bridge is coupled between the first and second buses. This bridge includes logic for comparing the address and the parity information and generating an address parity signal when there is an address parity error. The bridge also includes a slave that receives the address parity error signal and generates a target-abort signal in response, and logic for preventing the target-abort signal from propagating to the first bus.

In preferred embodiments, the first bus is a PCI bus, and the master is a PCI master and the slave is a PCI slave.

The present invention provides the advantage of allowing the PCI slave within the bridge to respond within the time periods specified by the PCI bus protocol, since the bridge simultaneously determines if there is an address parity error and prevents the target-abort signal (the device select signal and the stop signal) from being propagated out of the bridge chip in the event that there is an address parity error.

The foregoing and other objects, features, aspects and advantages of the present invention will become more apparent from the following detailed description of the present invention when taken in conjunction with the accompanying drawings.

DESCRIPTION OF THE ILLUSTRATIVE EMBODIMENTS

Figure 1:
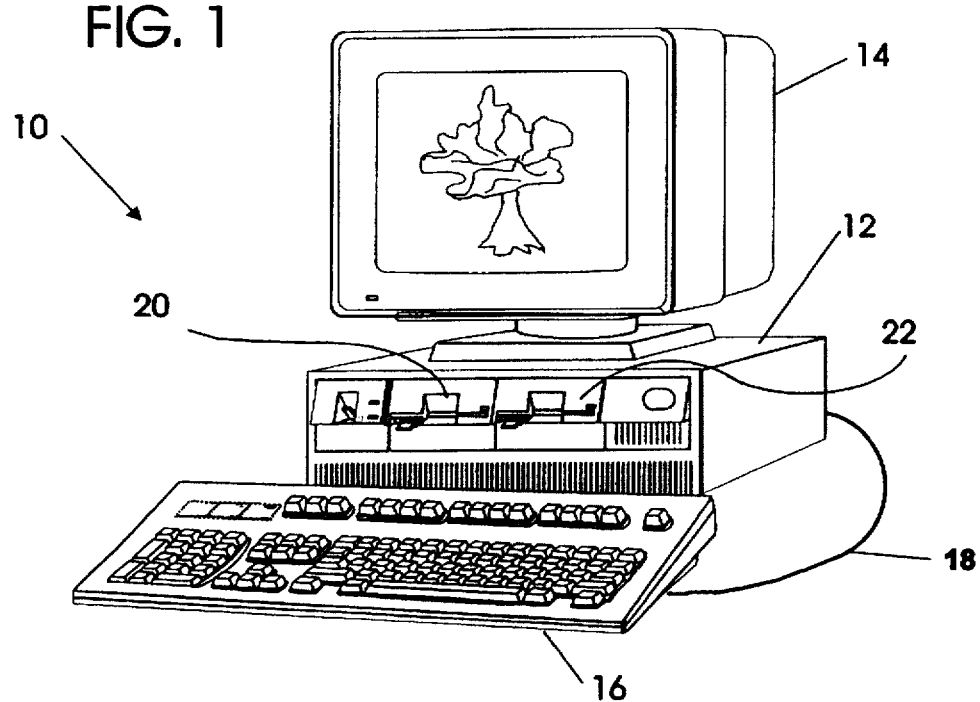
FIG. 1 is a perspective view of a computer of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

Figure 2:
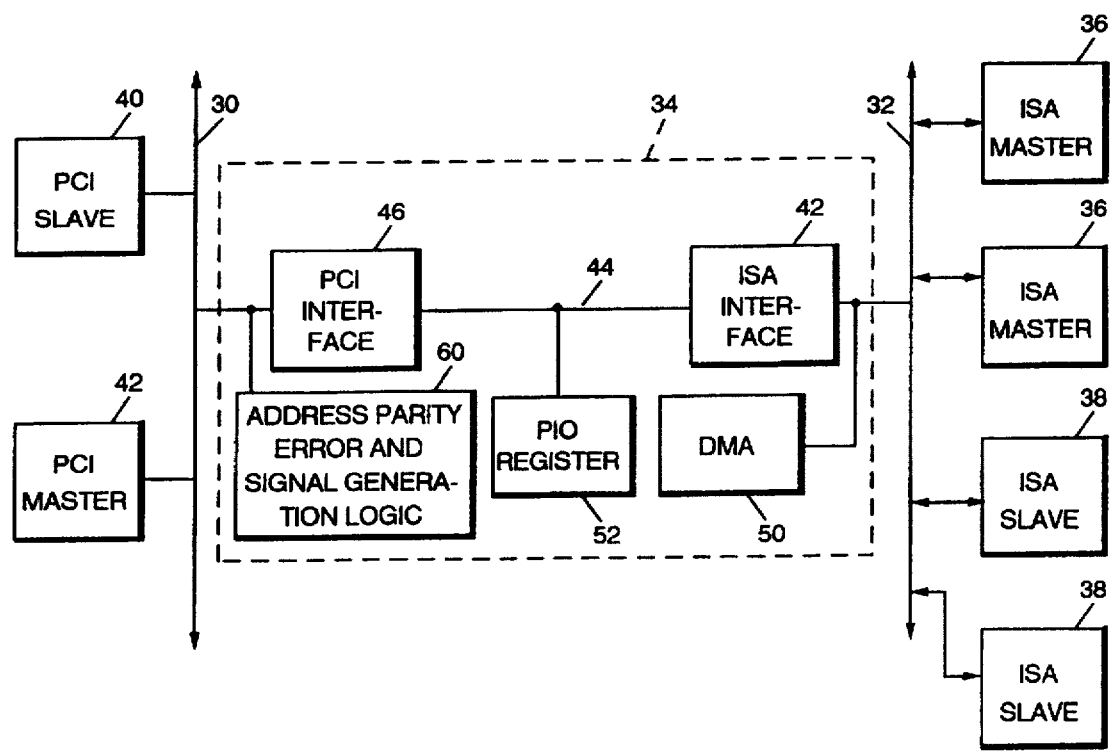
FIG. 2 is a block diagram with a computer system of FIG. 1 constructed in accordance with an embodiment of the present invention.

FIG. 2 is a block diagram of a computer system constructed in accordance with an embodiment of the present invention. The system includes a PCI bus 30, an ISA bus 32, with a plurality of ISA masters 36 and ISA slaves 38. A plurality of PCI memory slaves 40 are coupled to the PCI bus 30.

The bridge chip 34 contains an ISA interface 42 coupled between the ISA bus 32 and a system bus 44. A PCI interface 46 is provided between the PCI bus 30 and system bus 44. The bridge chip 34 also has a DMA controller 50, programmable I/O (PIO) registers 52 and address parity error and PCI signal generation logic 60 that will be described later. The DMA controller 50 is coupled to the ISA bus 32. The bridge chip 34 provides an interface between the PCI bus 30 and the ISA bus 32.

The ISA bus interface 42 in the bridge chip 34 translates ISA bus cycles into a system bus cycle for use by the bridge chip 34. The PCI bus interface 46 converts PCI bus cycles from the PCI bus 30 into system bus cycles for the bridge chip 34. The DMA controller 50 controls DMA control of memory accesses within the system. The DMA controller 50 provides a plurality of separate DMA channels over which memory accesses involving the individual ISA masters 36 are respectively communicated.

Either the DMA controller 50 or the ISA bus master 36 can generate transfer cycles, since the DMA controller 50 acts as a bus master on the ISA bus 32. Both the ISA master 36 and the DMA controller 50 can access memory located on either the ISA bus 32 or the PCI bus 30. For ease of explanation in the following description, however, examples will be described in which the ISA bus master 36 is generating transfer cycles. When this occurs, the DMA controller 50 acts as an arbitration device.

Figure 3:
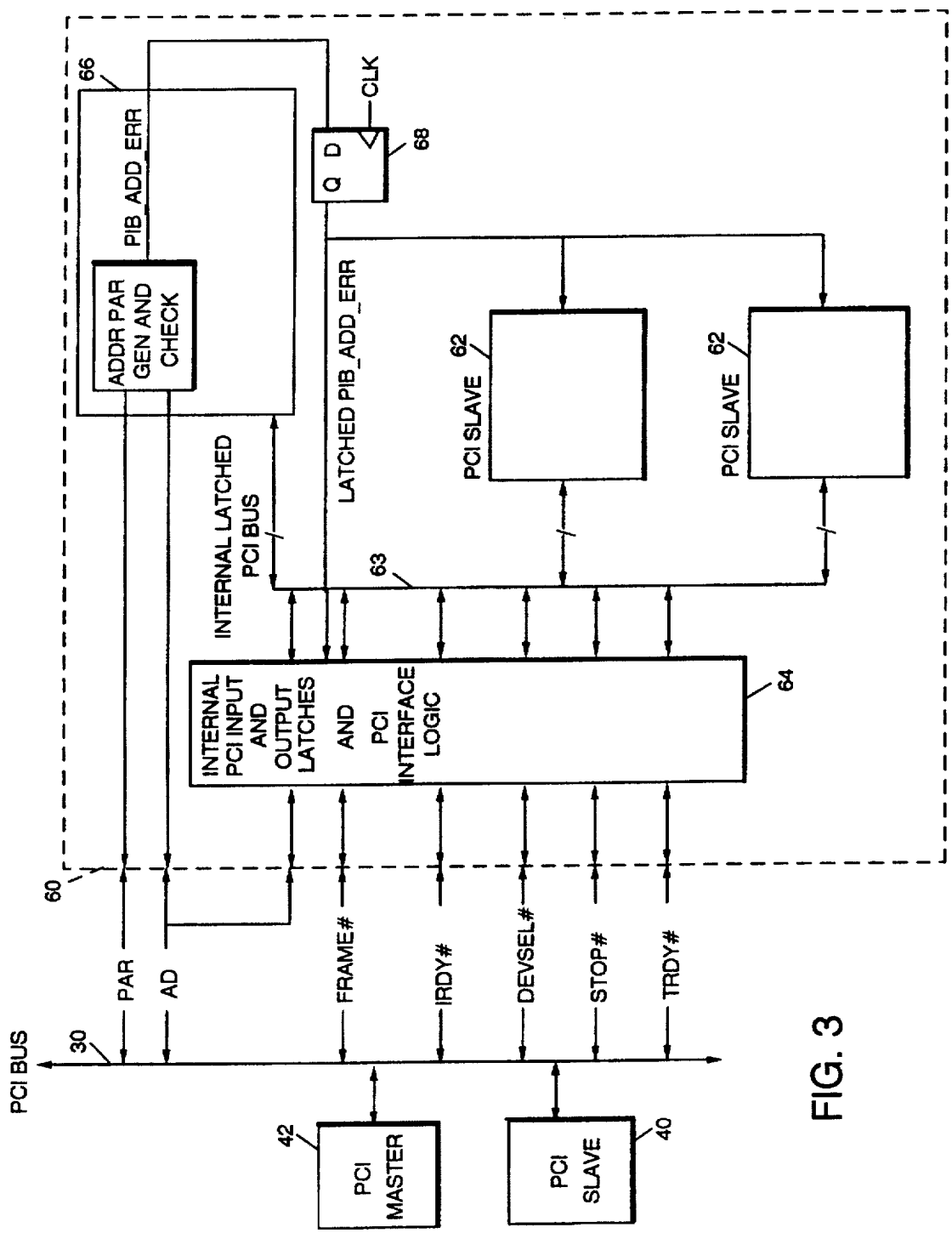
FIG. 3 is a block diagram of the address parity error and PCI signal generation element of the bridge constructed in accordance with an embodiment of the present invention.

FIG. 3 is a block diagram of the address parity error and PCI signal generation logic 60 depicted in the bridge chip 34 in the system of FIG. 2. The logic 60 includes a plurality of PCI slaves 62, in this example, that are coupled to an internal latched PCI bus 63. An internal PCI input and output latch and PCI interface logic 64 (hereinafter "PCI latch and interface logic 64") is coupled between the PCI bus 30 and the internal latched PCI bus 63. The PCI latch and interface logic 64 receives the signals from the PCI bus 30 and the internal latched PCI bus 63 and latches these signals for use by the bridge 34 and the logic 60. Latches are needed since the PCI bus 30 operates at a high speed and PCI slaves 62, implemented in a slow technology, cannot reliably operate with unlatched signals.

The PCI latch and interface logic 64 receives from the PCI bus 30 the address signals, the frame signal (FRAME#), the IRDY# (initiator ready) signal. The logic 64 sends the device select signal (DEVSEL#), the stop signal (STOP#), and target ready signal (TRDY#). Latched versions of each of these signals on the internal latched PCI bus 63.

The address from the PCI bus 30 is also received by an address parity generator and check logic 66. In addition to the unlatched address, the address parity generator and check logic 66 (hereinafter the "check logic 66") receives unlatched parity information from the PCI bus 30. The unlatched parity address information and the address are compared, and if there is an error, the check logic 66 changes the level of the internal bridge address error signal (PIB_ADD_ERR). This signal is latched at a separate latch 68, where it is available to the PCI slaves 62.

A basic description of the operation of the address parity error and PCI signal generation logic 60 will be described, with a more detailed description of an address parity error response, including a timing diagram, following this brief description.

When a master 42 desires to perform a master-slave transaction with one of the PCI slaves 62, the master 42 asserts FRAME#, an address, and address parity information on the PCI bus 30. The address parity error and PCI signal generation logic 60 on the bridge 34 receives FRAME# and the address information in the internal PCI latch and interface logic 64 where it is latched for use in the bridge chip 34. The latched FRAME# and address signals are placed onto the internal PCI bus 63 where they are available to the PCI slaves 62. The PCI slaves 62 decode the latched address and determine whether the particular PCI slave 62 is to respond to the master 42. One of the PCI slaves 62, assuming that decoding indicates that this particular PCI slave 62 is to respond, asserts a device select signal DEVSEL# on the internal latched PCI bus 63. The internal PCI latch and interface logic 64 asserts the device select signal DEVSEL# on the PCI bus 30 where it is received by the master 42. The particular transaction is then performed when the IRDY# and TRDY# are both asserted.

All of the above operational description assumes that the address and address parity information check has not caused an address parity error signal to be generated. This checking is performed at the same time as the address is being decoded by the PCI slaves 62.

Assume, however, now that the address parity information check performed by the check logic 66 indicates that there is an address parity error. Also assume that one of the PCI slaves 62 has claimed the address by asserting DEVSEL#. The check logic 66 asserts the internal bridge address parity error signal (PIB_ADD_ERR) where it is latched by latch 68. The latched address parity error signal is sent to the PCI slaves 62. The PCI slave 62 that claimed the address then performs a target-abort of the master-slave transaction. This is accomplished by the deassertion of the device select signal DEVSEL# and the assertion of the stop signal STOP# by the PCI slave 62. The latched internal bridge address parity error signal is provided to the internal PCI latch and interface logic 64, which has also received a device select signal. When the internal PCI latch and interface logic 64 has received both the latched address parity error signal, and the device select signal DEVSEL#, the logic 64 blocks both the device select signal DEVSEL# and the slave stop signal STOP# from propagating (being latched) to the PCI bus 30. The target-abort is therefore not seen on the PCI bus 30 by the master 42. If no other slave on the PCI bus 30 claims the address by assertion of a device select signal DEVSEL# within a predetermined time period after the master 42 asserted FRAME#, the master 42 will perform a master-abort.

It should be recognized that the device select signal DEVSEL# assertion could not be delayed by the PCI slave 62 until the unlatched internal bridge address parity error information is decoded since the PCI bus protocol requires that the PCI slave 62 responds internally with a fast response (in the first clock after assertion of FRAME#) so that the external response, which is a slow response (in the third clock after assertion of FRAME#), is possible within the time constraints of the PCI bus protocol.

A more detailed explanation of the address parity error response by the arrangement of the present invention will now be described with reference to the timing diagram of FIG. 4.

The master 42 asserts the frame signal FRAME# and the address information in clock 1. This information is latched in the PCI latch and interface logic 64 in clock 2. During clock 2, the address parity information is received from the master 42. This information is compared with the address by the check logic 66 during clock 2. At the same time that the check logic 66 is checking the parity information, the PCI slave 62 sees the asserted latched FRAME# and decodes the latched address.

In this example, the comparison by the check logic 66 of the address parity information with the address indicates an address parity error. The check logic 66 therefore generates an internal bridge address parity error signal (PIB_ADD_ERR) at the end of clock 2. This signal is latched (LATCHED PIB_ADD_ERR) in clock 3. However, the PCI slave 62, which has decoded the address, responds to the latched FRAME# in clock 3 in order to meet the timing requirements of the PCI bus 30 by asserting the device select signal DEVSEL#. The PCI slave 62 therefore operates internally as a "fast" PCI slave since it responds within one cycle after receipt of the latched FRAME#. To the PCI master 42, however, which receives the device select signal DEVSEL# from the slave 62 (when there is not an address parity error) three cycles after the assertion of the frame signal FRAME#, the PCI slave 62 is a "slow" slave.

By clock cycle 4, the PCI slave 62 recognizes the latched address parity error signal (the PIB_ADD_ERR signal) and performs an internal target-abort by deasserting the device select signal DEVSEL# and asserting the stop signal STOP#. This effectively stops the PCI slave 62 from performing the master-slave transaction. The PCI latch and interface logic 64 has prevented the device select signal DEVSEL# and the stop signal STOP# from propagating onto the PCI bus 30 as a target-abort where it would be seen by the master 42. The PCI latch and interface logic 64 blocks DEVSEL# and STOP# in response to receipt of the latched PIB_ADD_ERR (latched address parity error signal) from the latch 68 and the device select signal DEVSEL# asserted by the PCI slave 62. Externally, the PCI device select signal DEVSEL# remains deasserted (at a high level), and the PCI stop signal STOP# also remains deasserted, as seen in the masked signals in FIG. 4. Another slave on the PCI bus 30 is able to claim the address, or the external PCI master 42 will perform a master-abort if it does not receive a device select signal DEVSEL# from another PCI slave on the PCI bus 30.

Figure 4:
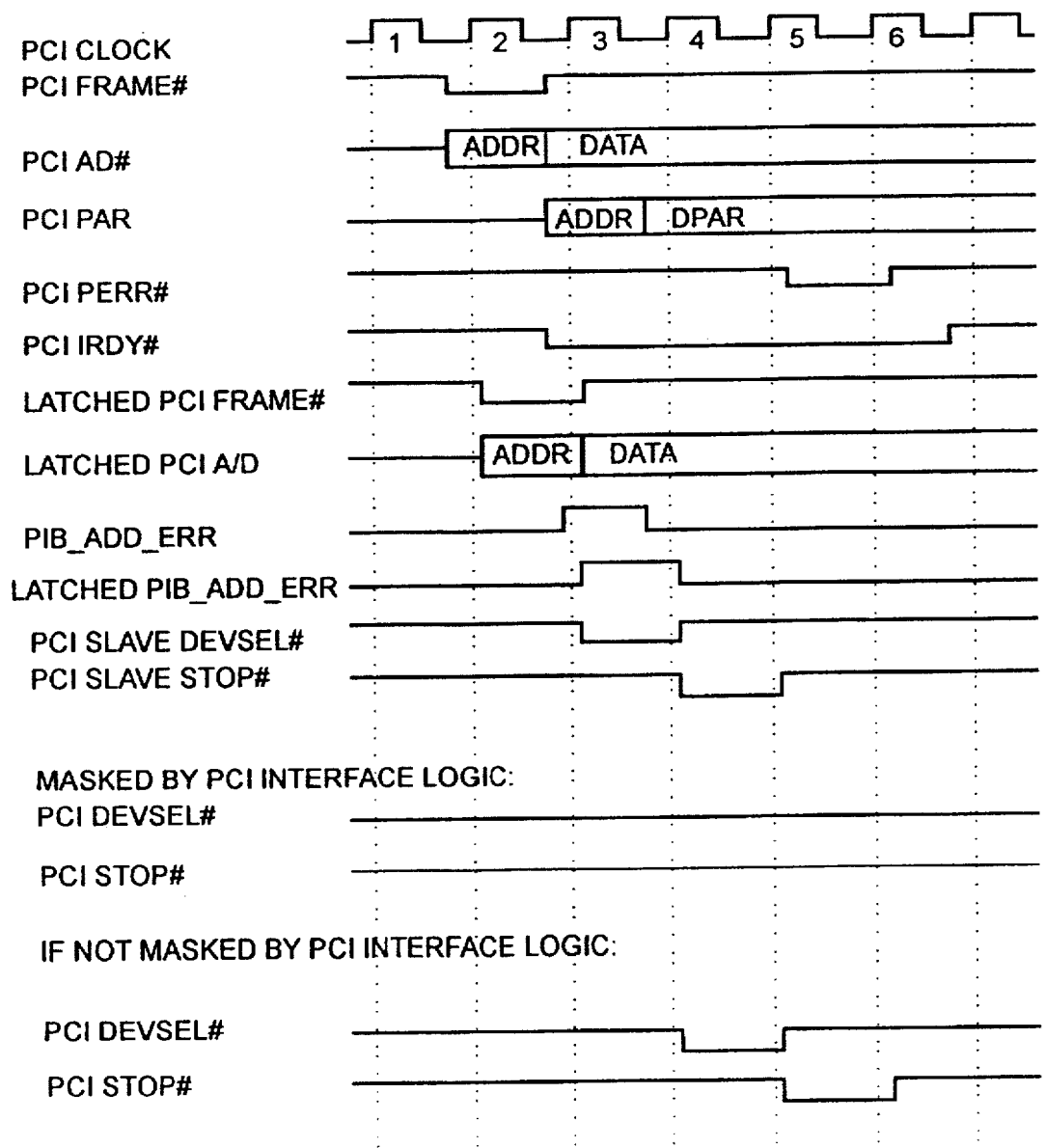
FIG. 4 is a timing diagram of an address parity error response in which an external PCI master-abort is formed from an internal PCI target-abort in accordance with a method of the present invention.

Without the present invention, the PCI device select signal DEVSEL# would be asserted on the PCI bus 30 as shown by the unmasked signals at the bottom of FIG. 4, followed by a PCI stop signal STOP# in clock 5. This would undesirably force a target-abort on the PCI bus 30.

With the arrangement and method of the present invention, the required master-abort termination of an address parity error is performed by the bridge chip 34, even though a target-abort mechanism is used to meet the technology/timing requirements internally. This allows the synthesis of the bridge chip in a slower, less expensive technology than would otherwise be possible.

The target-abort generated internally from the latched parity internal bridge address parity error information signal ensures that in worst case boundary conditions, the internal PCI slave 62 will guarantee proper state machine control. If the unlatched address parity error signal were used to perform a master-abort internally, under worst case conditions, unpredictable behavior would result.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bridge for interfacing between a first bus and a second bus of a computer system with at least one master on said first bus which sends commands including a device address and address parity data, the master treating a command as invalid if a device select signal is not returned within a predetermined interval, the bridge comprising:

at least one slave device;

an internal bus coupled to said at least one slave device and connected to receive such a command;

logic for latching such a command received at said internal bus to be readable by said at least one slave device;

logic for passing a device select signal from said at least one slave device to said first bus as an indication that said at least one slave device has claimed said command, said at least one slave device also having logic that upon detecting an address parity error attempts to abort the command by asserting a stop signal; and logic for testing address and parity data at the time of latching the corresponding command to the internal bus and asserting an error signal in the event of an address parity error and associated logic which in response to said error signal blocks the device select and stop signal from being asserted on the first bus, whereby the command may continue to be accepted elsewhere by another slave device on the system within said predetermined interval established by the master.

2. A bridge according to claim 1 wherein the first bus is based on the PCI bus standard and the second bus is based on the ISA bus standard.

3. A computer system comprising:

a first bus;

a second bus;

at least one master on said first bus which sends commands including a device address and address parity data, the master treating a command as invalid if a device select signal is not returned within a predetermined interval; and a bridge connecting said first and second busses which includes;

a at least one slave device;

an internal bus coupled to said at least one slave device and connected to receive such a command;

logic for latching such a command received at said internal bus to be readable by said at least one slave device;

logic for passing a device select signal from said at least one slave device to said first bus as an indication that said at least one slave device has claimed said command, said at least one slave device also having logic that upon detecting an address parity error attempts to abort the command by asserting a stop signal; and logic for testing address and parity data at the time of latching the corresponding command to the internal bus and asserting an error signal in the event of an address parity error and associated logic which in response to said error signal blocks the device select and stop signal from being asserted on the first bus, whereby the command may continue to be accepted elsewhere by another slave device on the system within said predetermined interval established by the master.

4. A system according to claim 3 wherein the first bus complies with the PCI bus standard and the second bus complies with the ISA bus standard.

* * * * *